(12) United States Patent
Beckley (10) Patent No.: US 7,819,728 B2
(45) Date of Patent: Oct. 26, 2010

(54) SHUTTER CUP

(75) Inventor: Daniel Vern Beckley, Byron, MI (US)

(73) Assignee: Magna International Inc., Aurora (CA)

( * ) Notice: Subject to any disclaimer, the term of this patent is extended or adjusted under 35 U.S.C. 154(b) by 1236 days.

(21) Appl. No.: 11/367,114

(22) Filed: Mar. 3, 2006

(65) Prior Publication Data

US 2006/0201273 A1 Sep. 14, 2006

Related U.S. Application Data

(60) Provisional application No. 60/660,455, filed on Mar. 10, 2005.

(51) Int. Cl.
| B60H 1/34 | (2006.01) |
| G03B 9/02 | (2006.01) |
| B65D 43/18 | (2006.01) |
| F16K 3/00 | (2006.01) |

(52) U.S. Cl. .................. 454/155; 454/152; 454/154; 396/505; 396/510; 220/822; 251/212

(58) Field of Classification Search .............. 454/152, 454/154, 155; 396/505, 510; 251/212; 220/822; 137/545; 74/473.3
See application file for complete search history.

(56) References Cited

U.S. PATENT DOCUMENTS

| 1,750,830 | A | * | 3/1930 | Wollensak | .................. 396/500 |
| 2,273,360 | A | * | 2/1942 | Kidder | ........................ 362/158 |
| 2,321,336 | A | * | 6/1943 | Tondreau | ..................... 251/212 |
| 2,471,172 | A | * | 5/1949 | Stoller | ........................ 215/11.1 |
| 2,649,272 | A | * | 8/1953 | Barbato | ...................... 251/212 |
| 2,969,142 | A | * | 1/1961 | Mack | ........................... 401/59 |
| 3,159,179 | A | * | 12/1964 | De Lain | ...................... 137/545 |
| 4,094,492 | A | * | 6/1978 | Beeman et al. | ............. 251/212 |
| 4,257,086 | A | * | 3/1981 | Gulliksen | ................... 362/279 |
| 6,758,452 | B1 | | 7/2004 | Salenbauch et al. | |
| 6,843,397 | B2 | | 1/2005 | Then et al. | |

\* cited by examiner

*Primary Examiner*—Steven B McAllister
*Assistant Examiner*—Patrick F. O'Reilly, III
(74) *Attorney, Agent, or Firm*—Honigman Miller Schwartz and Cohn LLP (57) ABSTRACT

A rotary shutter actuator comprising a retainer, a rotatable member, a plurality of shutters, and a dial. The rotatable member is supported by the retainer, and the plurality of shutters are swivelably coupled to the retainer. The dial has an opening and is operably connected to each of the shutters and the rotatable member. Thus, as the dial is rotated, the shutters move to and from a fully open and closed position. The dial also causes the rotatable member to rotate with respect to the retainer.

31 Claims, 8 Drawing Sheets

SHUTTER CUP

CROSS-REFERENCE TO RELATED APPLICATIONS

This application claims the benefit of U.S. Provisional Application No. 60/660,455, filed Mar. 10, 2005.

FIELD OF THE INVENTION

The invention generally relates to vehicular interior trim components having a rotary shutter actuator.

BACKGROUND OF THE INVENTION

Many vehicles today have interior features that would be better served with the ability to be adjusted. By having the ability to adjust the interior trim component, the vehicle's occupant can adjust different features in the vehicle such as the air flow from the vehicle's ventilation system. By having the adjustable features, the interior trim component can be adjusted to the vehicle's occupant's satisfaction. However, the adjustable interior trim components do not always have sufficient adjustment capabilities, for example, a vehicle's ventilation system may only have a limited number of adjustments to control the air flow discharged by the vehicle's ventilation system. Thus, the vehicle's occupant is limited to the number of options for controlling the air flow due to the lack of intermediate adjustments.

By contrast, there are other interior trim components that are not adjustable and the vehicle's occupant does not have the ability to alter the interior trim component to satisfy their needs. For example, in many vehicles the cup holder, whether in the center console or in another area inside the passenger compartment, are normally one size and the vehicle's occupant does not have the ability to change the size of the cup holder. Thus, if the vehicle's occupant has a beverage container or other object that is larger than the diameter of the cup holder, the object cannot be stored in the cup holder. Similarly, if the vehicle's occupant has a beverage container or other object that is substantially smaller than the diameter of the cup holder, the cup holder does not do an adequate job of securing the object due to the size difference.

Therefore, it would be desirable to develop an interior trim component that has an adjustment mechanism with an infinite number of adjustments in order to satisfy the needs of the vehicle's occupant. The interior trim component can be used for example, but not limited to, an adjustment mechanism for the vehicle's ventilation system or a cup holder.

SUMMARY OF THE INVENTION

The present invention relates to a rotary shutter actuator comprising a retainer, a rotatable member, a plurality of shutters, and a dial. The rotatable member is supported by the retainer, and the plurality of shutters are swivelably coupled to the retainer. The dial has an opening and is operably connected to each of the shutters and the rotatable member. Thus, as the dial is rotated, the shutters move to and from a fully open and closed position. The dial also causes the rotatable member to rotate with respect to the retainer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Furthermore, like numerals depicted in the Figures represent like elements that include similar features.

Figure 1:
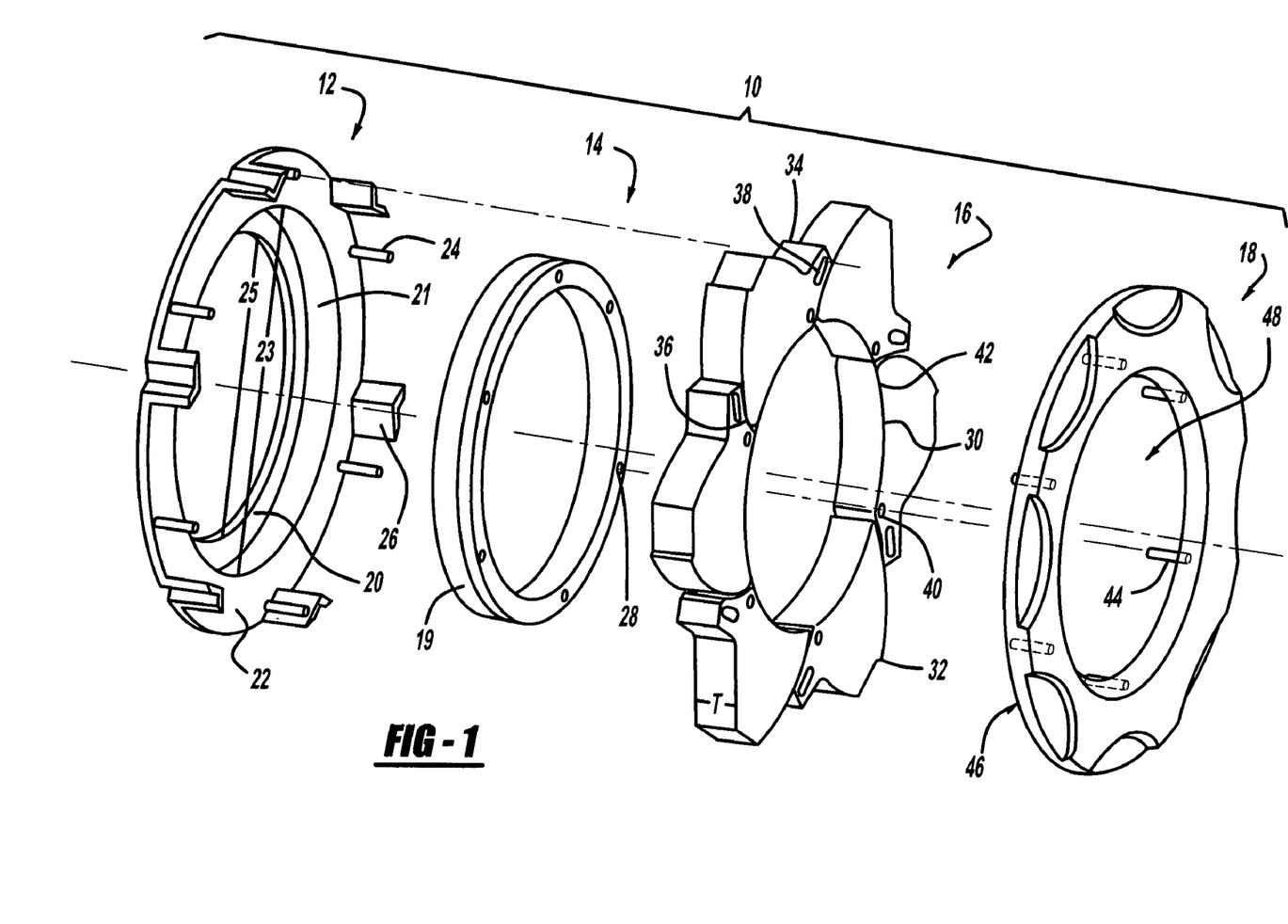
FIG. 1 is an exploded perspective view of a rotary shutter actuator for an interior trim component according to an embodiment of the present invention.

Referring to FIG. 1, a rotary shutter actuator is generally shown at 10. The rotary shutter actuator 10 comprises a retainer 12, a rotatable member 14, a plurality of shutters 16, and a dial 18. The retainer 12 includes a recessed inner ring 20, an inner wall 21, and an outer ring 22. In a preferred embodiment, the outer ring 22 has an opening with a first diameter 23 and the inner ring 20 has an opening with a second diameter 25, wherein the first diameter 23 is larger than the second diameter 25. The inner wall 21 connects the outer ring 22 with the recessed inner ring 20. Furthermore, the retainer 12 has a plurality of retainer fasteners 24 extending from the outer ring 22 and extending away from the inner ring 20. The plurality of retainer fasteners 24 are circumferentially placed around the outer ring 22 so that the retainer fasteners 24 are an equal distance from a center of the retainer 12. Furthermore, a plurality of stoppers 26 extend from the retainer 12 in the same direction as the retainer fasteners 24, and are circumferentially placed around the outer ring 22.

The rotatable member 14 has an outer wall 19 and a diameter substantially equal to the diameter 23 of the outer ring's 22 opening. Also, the rotatable member 14 has an opening which is substantially equal to the diameter 25 of the inner ring's 20 opening. The rotatable member 14 has a plurality of rotatable member attachment points 28 that are circumferentially placed around the rotatable member 14. Preferably, the rotatable member attachment points 28 represent apertures formed in the rotatable member 14.

Next, the plurality of shutters 16 are arranged on a common plane to one another. The shutters 16 have an arcuate shape with a leading edge 30 and a trailing edge 32. The shutters 16 also have a first end 34 and a second end 36. A slot 38 is located adjacent the first end 34. A shutter hole 40 is located intermediate to the slot 38 and the second end 36. Furthermore, a tip portion 42 is at, around, or defined by a portion of the second end 36 of the shutter 16. The common plane arrangement of the shutters 16 provides a compact shutter 16 structure, which minimizes the occupying space, both in use and for manufacturing and shipping purposes.

The dial 18 has a base 46 presenting an upper surface, and a lower surface opposite the upper surface. Dial fasteners 44 extend from the lower surface so as to define a circumferential pattern. Preferably, the dial fasteners 44 are integrally formed from the base 46. The dial 18 has an opening 48 that is substantially equal to the diameter 23 of the opening in the outer ring 22.

When assembled, the rotatable member 14 rests on the recessed inner ring 20. Then the shutters 16 are swiveably coupled to the outer ring 22 by disposing each of the retainer fasteners 24 in a corresponding slot 38. In an alternate embodiment, the placement of the slot 38 and the retainer fasteners 44 can be reversed. The dial 18 is then placed on top of the shutters 16 so that the dial fasteners 44 extend through a corresponding shutter hole 40 and a corresponding attachment point 28 so as to operably couple the dial 18 to the shutter 16 and the rotatable member 14. Thus, the rotatable member attachment points 28 circumferentially placed around the rotatable member 14, the shutter holes 40, and the dial fasteners 44 circumferentially placed around the dial 18 all have a similar diameter and are aligned when the components are connected.

When the dial 18 is rotated, the dial fasteners 44 transfer the rotating motion to the shutters 16 and the rotatable member 14. The rotation of the dial 18 causes the rotatable member 14 to rotate within the inner ring 20. Also, the rotation of the dial 18 causes movement of the shutters 16. Specifically, the dial fasteners 44 extending through the shutter holes 40 create a moment arm relative to the respective retainer fasteners 24 disposed in the slots 38. It should be appreciated that the dial fasteners 44 can be fixed with respect to the rotatable member 14 and the shutters 16 or could be loosely disposed in the shutters hole 40 and in the attachment points 28. As such, rotating the dial 18 causes the shutters 16 to swivel about the retainer fasteners 24 such that the slot 38 guides the motion of the shutters 16 about the respective retainer fastener 24. Accordingly, the motion or swivel action of the shutters 16 is defined by the shape of the respective slot 38.

It should be appreciated that the primary function of the rotatable member 14 is to impart a predetermined amount of friction between the outer wall 19 of the rotatable member 14 and the inner wall 21 of the retainer 12 and between the bottom surface of the rotatable member 14 and the inner ring 20. Accordingly, in order to rotate the dial 18, and cause the shutters 16 to move, the dial 18 must be rotated with a sufficient amount of force to overcome the friction between rotatable member 14 and the inner ring 20 and inner wall 21. More importantly, the friction defined between the rotatable member 14 and the retainer 12 prevents inadvertent movement of the shutters 16 due to road inputs or the like.

The friction between the retainer 12 and the rotatable member 14 is created in numerous ways. For example, the friction is created by the surface to surface contact between the retainer 12 and the rotatable member 14. Thus, the amount of friction is determined based upon the tolerance between the diameter of the opening of the retainer 12 and the diameter of the rotatable member 14, and the contacting surface materials on the retainer 12 and rotatable member 14. The friction between the retainer 12 and rotatable member 14 can also be predetermined based upon a secondary component which is described in greater detail below.

Figure 2:
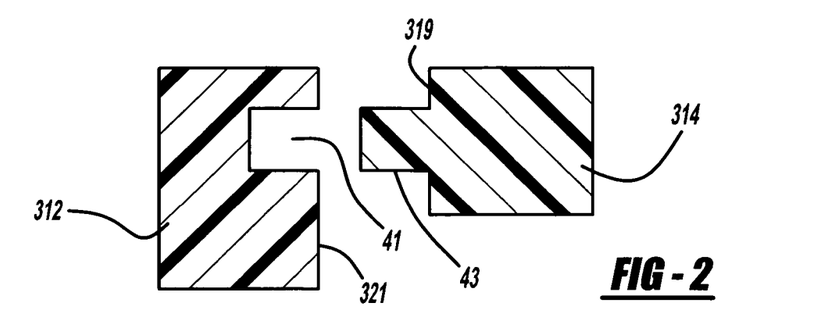
FIG. 2 is a cross-sectional view of a rotatable member operably connected to a retainer according to an embodiment of the present invention.

Referring to FIG. 2, in an alternate embodiment, the retainer 312 does not have the inner ring 20. Instead, the rotatable member 314 is rotatably connected to the retainer 312 by the inner wall 321. A groove 41 extends around the inner wall 321 radially from the center of the retainer 312. Then an extension 43 extends from an outer wall of 319 of the rotatable member 314 into the groove 41. Thus, the rotatable member 314 is rotatably connected to the retainer 312, and the connection between the groove 41 and extension 43 creates friction which must be overcome in order for the rotatable member 314 to rotate with respect to the retainer 312. Typically, at least two extensions 43 extend into the groove 41 in order to balance the rotation member 314. Also, the groove 41 extends entirely around the retainer 312 so that the extension 43 continuously moves along the groove 41, or the groove 41 extends along a portion of the retainer 312 so that the extension 43 does not move completely around the retainer 312. Therefore, the groove 41 can be any predetermined shape or length in order to control the rotating motion of the rotatable member 314.

Figure 11:
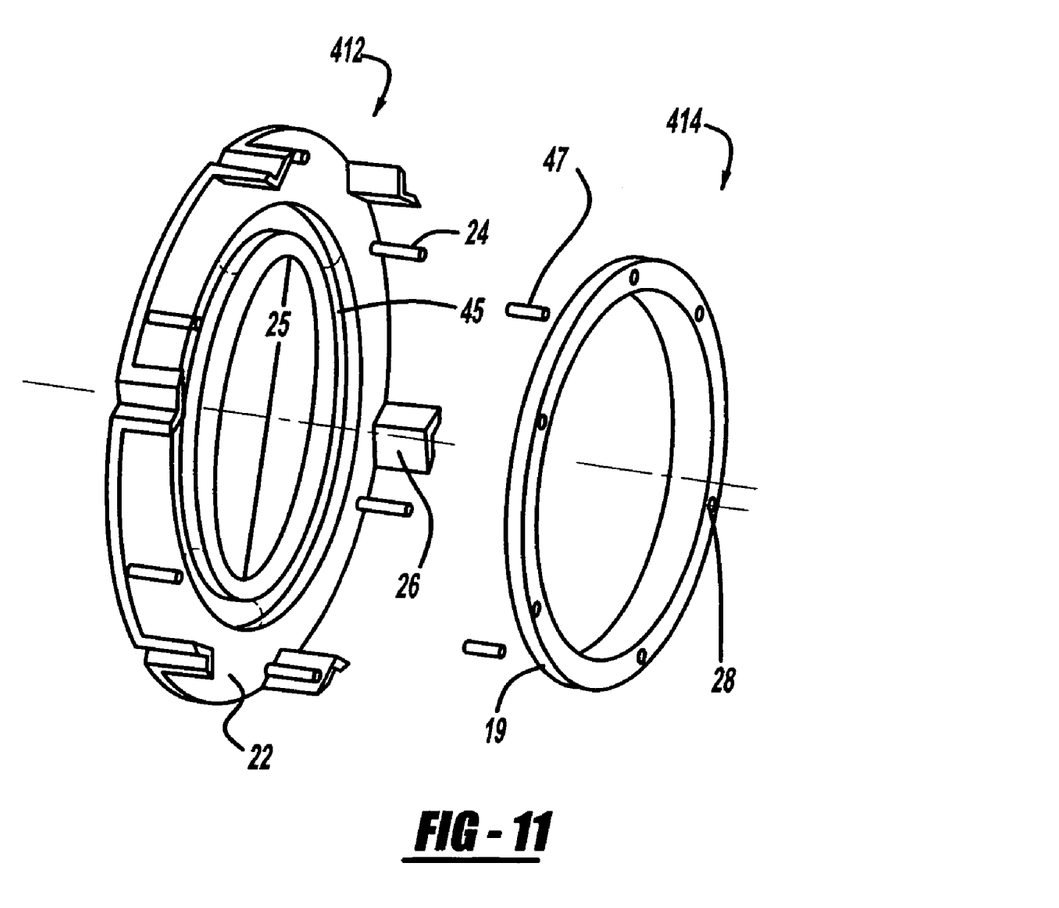
FIG. 11 is a perspective view of an alternate embodiment of the rotatable members operably connected to the retainer in accordance with the present invention.

In reference to FIG. 11, an alternate embodiment is shown where the retainer 412 has a groove 45 extending radially around the outer ring 22. The rotatable member 414 has at least one extension 47 extending from the base of the rotatable member 414 towards the retainer 412. Thus, the extension 47 is disposed in the groove 45 when the rotatable member 414 is placed on the outer ring 22, and the groove 45 guides the motion of the rotatable member 414. It should be appreciated that the groove 45 and extension 47 can be switched so that the groove 45 is on the rotatable member 414 and the extension 47 is on the retainer 412.

In order for the rotatable member 414 to rotate with respect to the retainer 412, the friction created by the extension 47 in the groove 45 and the surface-to-surface contact between the retainer 412 and rotatable member 414 must be overcome. Typically, two or more extensions 47 will be disposed in the groove 45 in order to provide a more balanced rotating motion between the retainer 412 and rotatable member 414. Furthermore, the groove 45 can be segmented (shown in phantom) so that it does not continuously extend a complete 360° around the retainer 412. Thus, the rotating motion of the rotatable member 414 is limited to the shape of the groove 45, since the rotatable member 414 is prevented from further rotation when the extensions 47 are stopped by either end of the groove 45. Therefore, the groove 45 can be any predetermined shape or length in order to control the rotating motion of the rotatable member 414.

Figure 3:
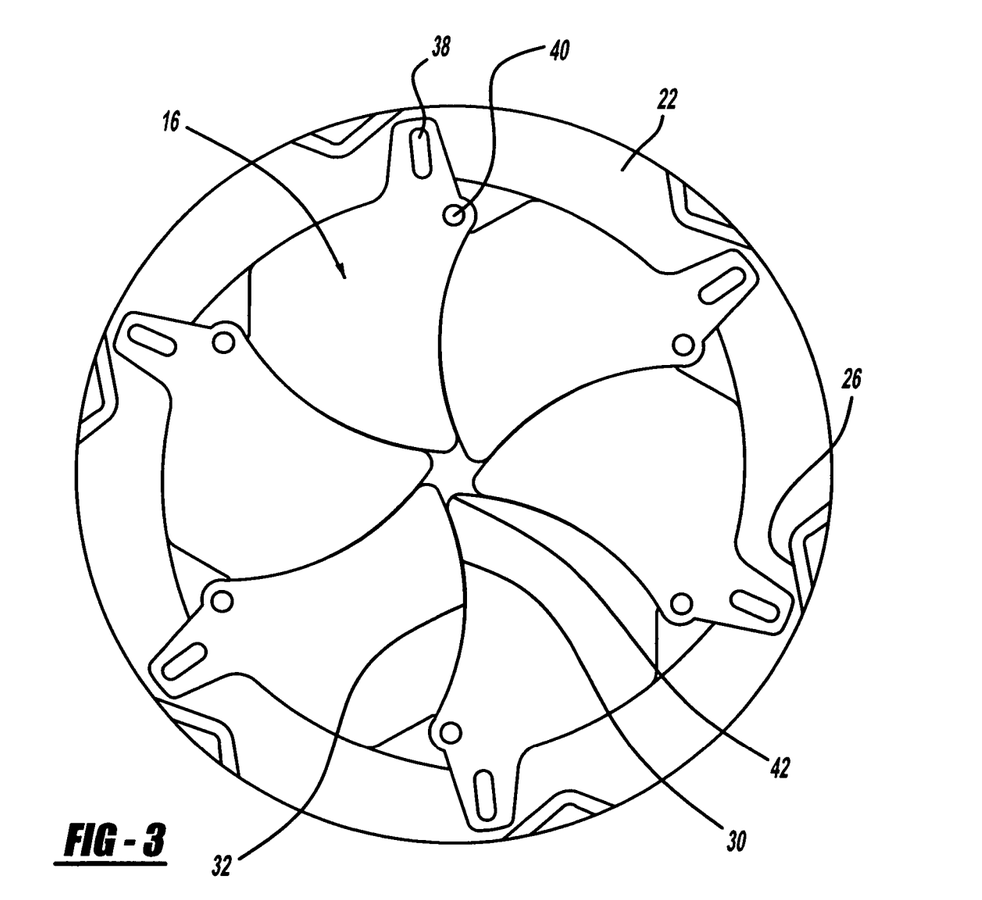
FIG. 3 is a top plan view of a plurality of shutters and outer ring of the rotary shutter actuator of the container assembly according to FIG. 1 when in a closed position.
Figure 4:
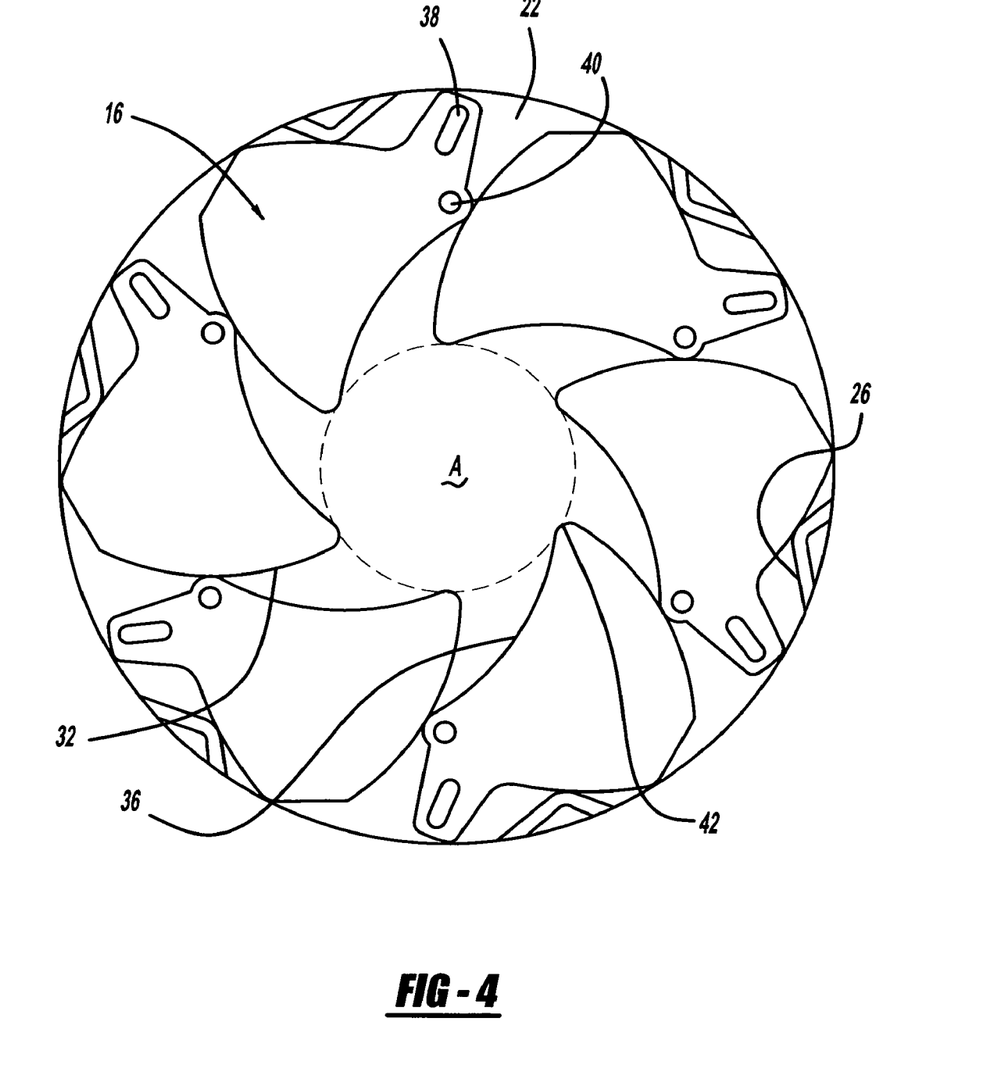
FIG. 4 is a top plan view of the rotary shutter actuator when in an intermediate or partially opened position.
Figure 5:
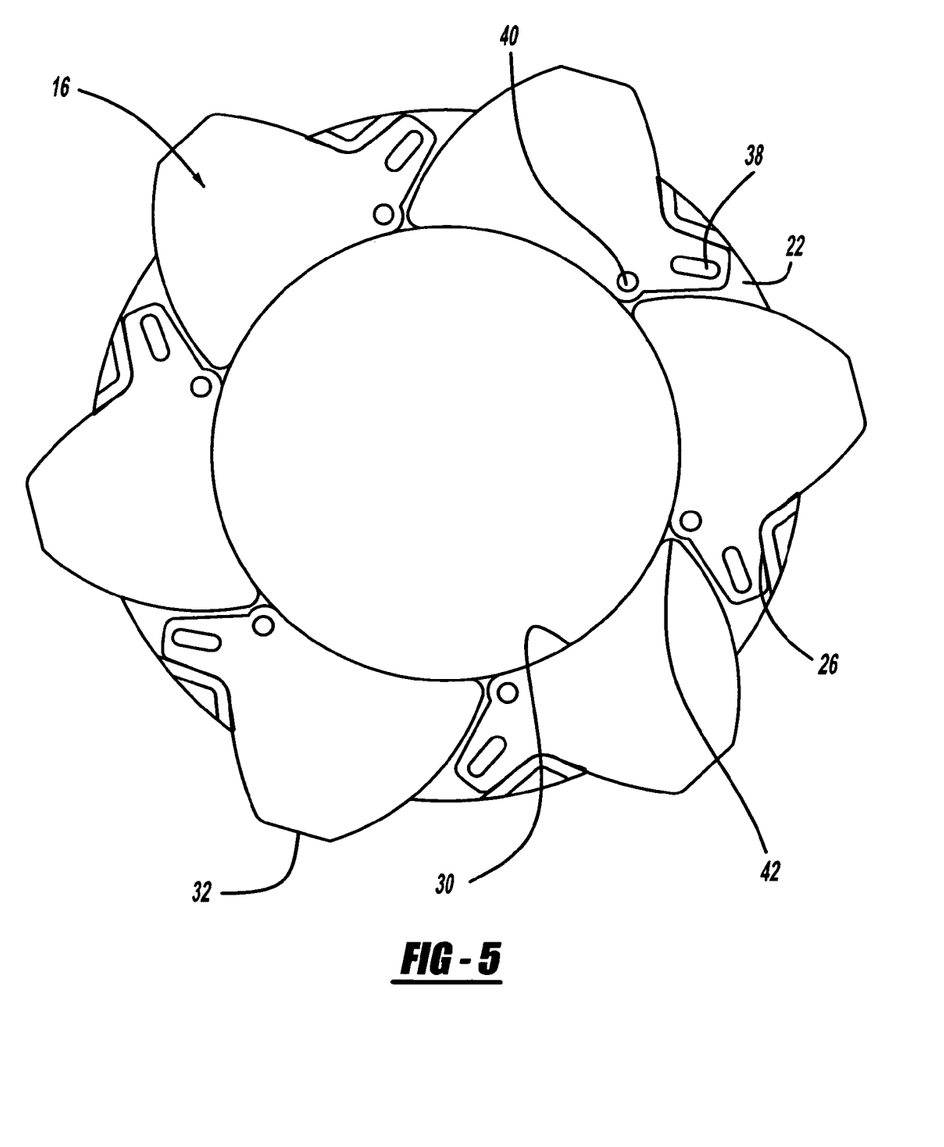
FIG. 5 is a top plan view of the rotary shutter actuator when in a fully opened position.

Referring to FIGS. 3-5, multiple shutter 16 positions are shown. When assembled the shutters 16 are arranged in a similar plane over the outer ring 22 for movement to and from a closed position (FIG. 3), an intermediate or partially open position (FIG. 4), and an open position (FIG. 5). Thus, as the dial 18 is rotated, the position of the shutters 16 is altered so that an aperture formed by the shutters 16 in relation to one another increases and decreases in size. The closed position of the shutters 16 is defined in several ways. First, the shutters 16 are in the closed position when a leading edge 30 of a shutter 16 contacts the trailing edge 32 of an adjacent shutter 16. Thus, the shutters 16 are unable to move in a closing direction when the leading edge 30 is contacting the trailing edge 32 of the adjacent shutter. In an alternate embodiment, the shutters 16 are in the closed position when the tips 42 converge upon one another whereby each tip portion 42 substantially contacts each of the opposing tips 42 of the remaining shutters 16. Similarly, when the tips 42 are contacting tips 42 of the remaining shutters 16, the shutters 16 are prevented from further movement in the closing direction. In an alternate embodiment, the retainer fasteners 24 contacting the ends of the slot 38 determine the closed position and/or the fully open position. Alternatively, in reference to the embodiments shown in FIGS. 2 and 11, in which the grooves 41 and 45, respectively, are segmented, the corresponding extensions 43 and 47 engage the ends of the segmented groove 41 and 45, respectively, so as to define the fully open and closed position.

When the shutters 16 are in the intermediate position, the tips 42 are arranged in a circular pattern and the shutters 16 do not contact adjacent shutters 16 in such a way that prevents the movement of the shutters 16. When the shutters 16 are in the open position, the tips 42 are diverged away from one another and the leading edge 30 of the shutters 16 is positioned in such a manner as to form the aperture or circular passage substantially equal to the diameter 25 of the opening in the inner ring 20. The fully open position of the shutters 16 is preferably controlled by the stoppers 26 preventing further motion of the shutters 16. Thus, as the shutters 16 move in an opening direction the shutters 16 contact the stopper 26 which prevents further movement of the shutter 16 in the opening direction.

In a preferred embodiment, a connection mechanism is created by the rotatable member attachment points 28, the shutter holes 40, and the dial fasteners 44. In an alternate embodiment, the connection mechanism is any combination of the above components that operably connect the rotatable member 14, the shutter 16, and the dial 18. Thus, a predetermined number of fasteners extend from any of the above components, and extend partially or completely into the remaining components. Furthermore, in a preferred embodiment, the dial fasteners 44 are integrated with the dial 18, such that when the dial 18 is molded the dial fasteners 44 are part of the mold. Also in a preferred embodiment, the retainer fasteners 24 are integrated with the retainer 12. However, in an alternate embodiment, any form of attachment is used between the dial 18 and the dial fasteners 44, such as but not limited to, a threaded screw or adhesive. Similarly, in an alternate embodiment the retainer fasteners 24 is, but not limited to, a threaded screw or a pin secured to the retainer 12 by an adhesive.

According to a preferred embodiment of the invention, the shutters 16 comprise any desirable wear-resistant material. For example, the plurality of shutters 16 may include, but are not limited to, a single material or multiple wear-resistant materials. In a preferred embodiment, the structure of each shutter 16 comprises a suitable material that is resistant to fracturing or other wear from multiple pivoting and rotation movements during the lifecycle of the rotary shutter actuator 10. Furthermore, the material of the shutter 16 needs to be resistant to an object being set on the shutters 16 when in the closed position. As described in greater detail below, the tips 42 contact and engage an article, A; thus, in a preferred embodiment, the tips 42 are made of an elastomer thereby providing a softer cushioning and gripping effect when the shutters 16 engage the article, A, but still positively secure the article, A. For example, the shutters 16 comprise a first material including, such as but not limited to, a thermoplastic resin having a Shore D hardness between about 60 and 80. However, in an alternate embodiment, the tips 42 are coated or molded with a second material, such as a rubber material, having a Shore A hardness between about 50 and 70. It will be appreciated that the invention is not limited to the Shore A and Shore D hardnesses described and that any desirable materials having any desirable hardness may be used for the shutters 16. Moreover, the shutters 16 include any desirable thickness, T. However, by increasing the thickness, T, the durability of the shutters 16 increase, and the shutters 16 are therefore less prone to damage when force is applied thereto.

Figure 6:
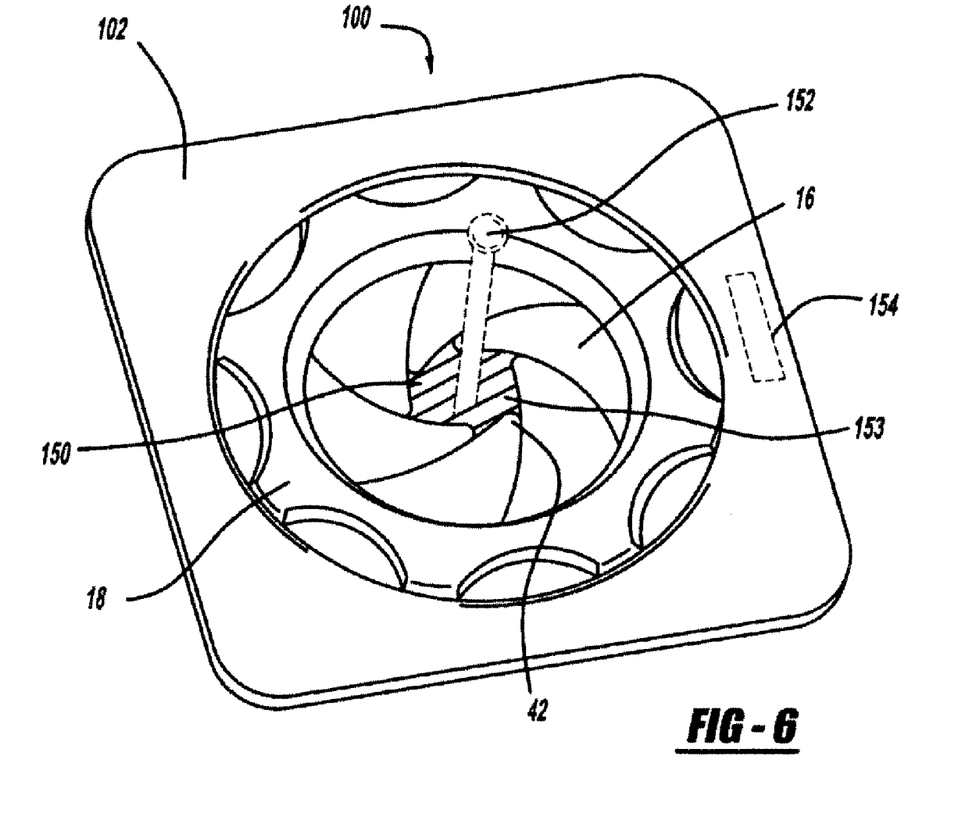
FIG. 6 is a perspective view of the rotary shutter actuator when used with an air vent.

In application, the rotary shutter actuator 10 is used as a selectively-adjustable close-out for any desirable component. Contemplated applications are, for example but not limited to, vehicular interior trim components. For example, FIG. 6 depicts a rotary shutter actuated air vent 100 in an instrument panel 102 of a heating, ventilation, and air conditioning (HVAC) system. In a preferred embodiment, the rotary shutter actuated air vent 100 includes retainer 12, the rotatable member 14, the shutters 16, and the dial 18. Thus, the rotary shutter actuated air vent 100 is placed over the end of an air duct or in the air duct with the dial 18 outside of the air duct, so that the position of the shutters 16 controls the amount of air flow exiting the air duct. In an alternate embodiment, the rotary shutter actuated air vent 100 is used with any suitable directional flow control mechanism 150. Thus, the directional control 150 is placed behind the rotary shutter actuated air vent 100 so that the dial 18 remains accessible. The directional flow control mechanism 150 is used in a variety of ways. For example, but not limited to, a joystick 152 extends from the vanes 153 of the directional flow control mechanism 150 and through the aperture of the shutters 16. Thus, the position of the vanes 153 is controlled by the joystick 152, which directs the air flowing from the air duct. In another embodiment, a thumb wheel 154 is placed on the instrument panel 102 that is operably connected to the directional flow control mechanism 150 in order to change the direction of the flow from the air vent. However, any suitable means for controlling the direction of the air flow from the air vent is used in combination with the rotary shutter actuated air vent 100.

In operation, when the user rotates the dial 18 as described above, a controlled amount of air flow passes through the rotary shutter actuated air vent 100. When the user rotates the dial 18 to the fully opened position (FIG. 5), a maximum amount of air flow is permitted to pass through the aperture created by the positioning of the shutters 16. When the user turns the dial 18 to the closed position (FIG. 3), the tips 42 of the shutters 16 converge upon and engage the joystick 152 to substantially prevent air flow from passing by the shutters 16. Accordingly, any position between the fully open and closed positions are used for selectively adjusting the amount of air flow; for example, if the user turns the dial 18 in the direction that causes the shutters 16 to be located in an intermediate position (FIGS. 4 and 6), the air flow path is lessened to a greater extent than if the shutters were in the fully open position (FIG. 5).

An example of another application is where the rotary shutter actuator 10 is part of a container assembly, such as cup or beverage holders that are located within reach of a vehicle's occupant. In addition, beverage holders are used for other unintended purposes, such as but not limited to, containing loose change, cell phones, personal digital assistants (PDAs), wallets, and wrist-watches. Thus, conventional beverage holders may undesirably expose articles stored therein for viewing by unintended persons. In the present invention, the rotary shutter actuator 10 is incorporated with the container assembly allowing closure of the shutters 16 in order to cover or hide articles placed therein.

Referring to FIGS. 7-10, a rotary shutter actuated container assembly is generally shown at 200. In a preferred embodiment, the rotary shutter actuated container assembly 200 includes shutter 16 and dial 18 of the rotary shutter actuator 10. A retainer 212 includes a housing or container portion 256 having a cavity 258. The cavity 258 is defined by the housing, a base or bottom wall 260, the recessed inner ring 20, and at least one side wall 262. The side wall 262 extends perpendicularly from the bottom wall 260 to the inner ring 20. In a preferred embodiment, the side wall 262 includes a circular shape to define the cylindrical cavity 258. However, in an alternate embodiment, the cavity 258 has any number of side walls 262. Furthermore, the retainer 212 includes stoppers 26, and holes 264 circumferentially placed around the outer ring 22. The rotary shutter actuated container assembly 200 also includes a frictional element 266 that is located on the inner wall 21.

Figure 7:
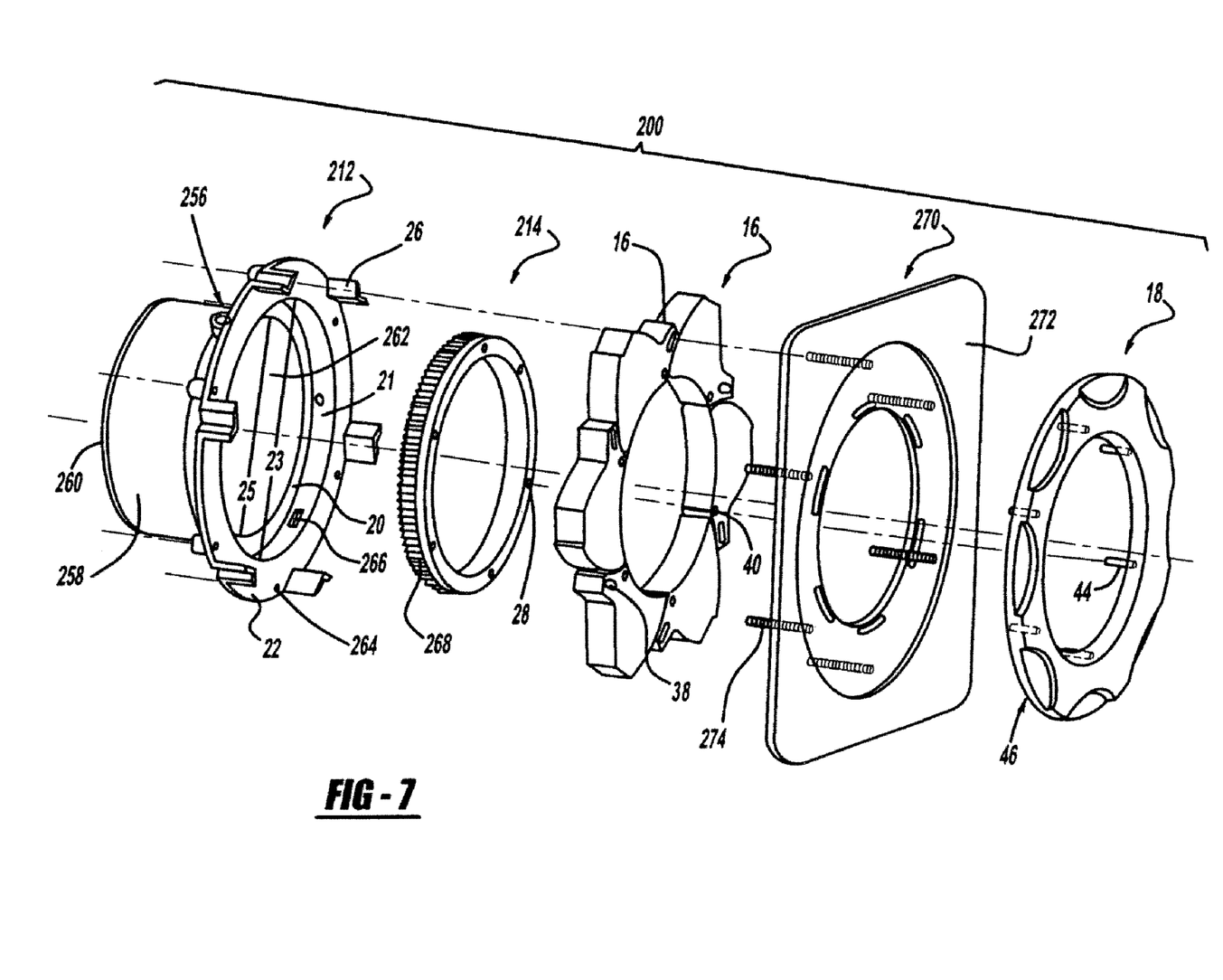
FIG. 7 is an exploded perspective view of a container assembly including the rotary shutter actuator according to an embodiment of the present invention.
Figure 8:
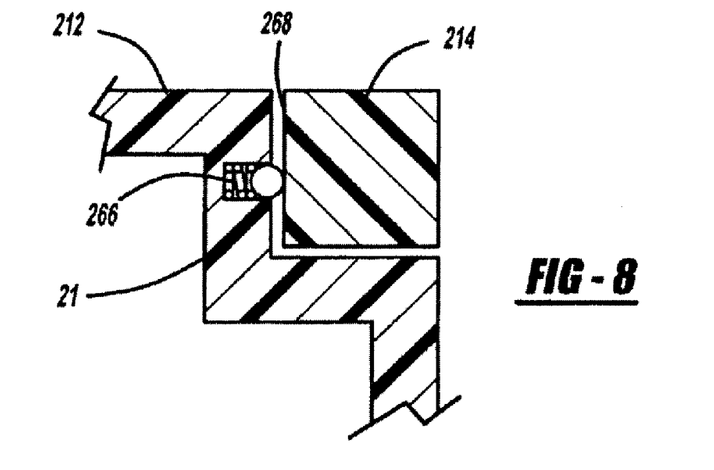
FIG. 8 is a cross-sectional view of a retainer portion of the rotary shutter actuator of FIG. 6.

A rotatable member 214 has rotatable member attachment points 28, and a plurality of teeth 268 that extend around the external circumference of the rotatable member 214. Also a top cover portion 270 has a top surface 272. In a preferred embodiment, the top surface 272 is a class "A" surface of an interior trim component, such as but not limited to, an arm rest or center console. In an alternate embodiment, the top cover portion 270 is a separate, decorative covering.

When assembled, the rotatable member 214 is placed in the retainer 212 on the recessed inner ring 20. The shutters 16 are then placed on top of the outer ring 22 of the retainer 212. Then the top cover portion 270 is placed over the shutters 16 so that the cover fasteners 274 extend through the slot 38 and into the container assembly holes 264. Then the dial 18 is placed on top of the top cover portion 270 so that the dial is operably connected to the shutters 16 and the rotatable member 214 by the dial fasteners 44, as described above.

Therefore, the rotary shutter actuated container assembly 200 operates in the same manner as described above so that the shutters 16 are repositioned between the closed position and the open position. Furthermore, the friction mechanism 266 creates a predetermined amount of friction between the rotatable member 214 and the retainer 212. The friction mechanism 266 provides resistance against a possible free moving action of the shutters 16 due to, for example but not limited to, vibrations from the vehicle. An example of the friction mechanism 266 is a spring-loaded ball that is placed on the inner wall so that the ball is biased by the spring towards the rotatable member 214. Thus, the amount of friction created by the ball and the rotatable member 214 is determinative on the strength of the spring that is used to bias the ball. Furthermore, the rotatable member 214 includes teeth 268 which engage the spring-loaded ball, so that as the rotatable member 214 is rotated, the teeth 268 push the ball away from the rotatable member 214 at the peak of the teeth 268. Similarly, at a detent area of the teeth 268 the ball is biased into the detent area by the spring. Another example of the friction mechanism 266 is a leaf spring which has two ends mounted to the inner wall, so that as the rotatable member 214 is rotated the leaf spring is compressed towards the inner wall. Again, the amount of friction created by the friction mechanism 266 is controlled by the strength of the leaf spring. However, in an alternate embodiment, any suitable means for creating friction between the rotatable member 214 and the inner wall 21 is used so that the amount of force transferred from the dial 18 must overcome the friction of the friction mechanism 266 in order for the shutters 16 to change positions. Additionally, the amount of friction generated by friction mechanism 266 is dependent upon, but not limited to, material selection, tolerances between the components, and surface treatments of the components.

Figure 9:
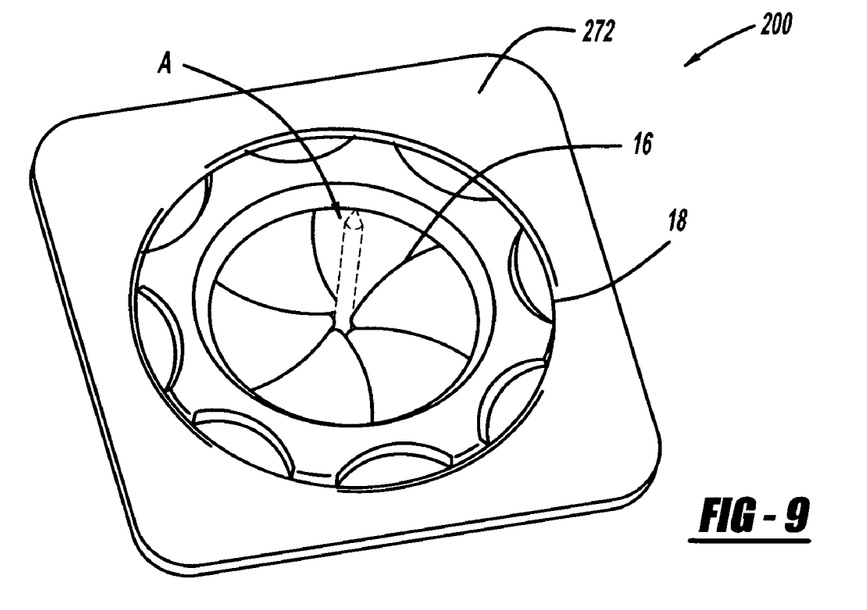
FIG. 9 is a top perspective view of the container assembly with the rotary shutter actuator in a closed position according to an embodiment of the present invention.
Figure 10:
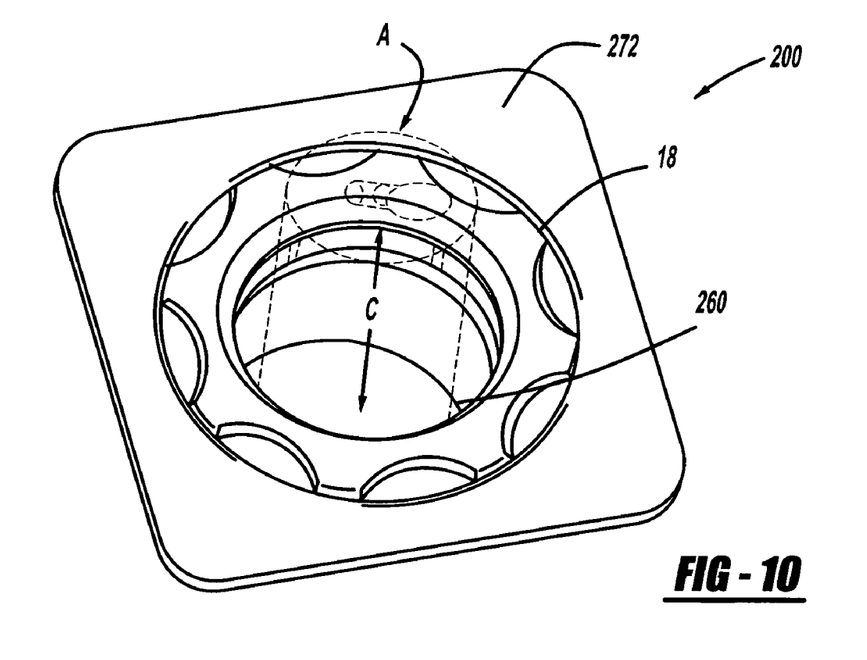
FIG. 10 is a top perspective view of the container assembly with the rotary shutter actuator in a fully opened position according to an embodiment of the present invention.

In a preferred embodiment, the rotary shutter actuated container assembly 200 has the capability to contain a variety of articles, which is shown generally at reference letter A in FIGS. 9 and 10. The article(s), A, are one or more, but not limited to, beverage containers (i.e. soda cans, cups, or bottles), writing utensils (i.e. pencils or pens), loose change, cell phones, PDAs, wallets, and wrist-watches. In an alternate embodiment, the cavity 258 includes a depth, C, which extends from the bottom wall 260 to a top portion of the shutter 16. Accordingly, articles(s), A, such as a pencil, (shown in phantom in FIG. 9) or a soda can (shown in phantom in FIG. 10) are located within the cavity 258.

When article(s), A, such as a wrist-watch, is placed in the cavity 258 and the articles(s), A, does not extend past the depth, C, the user may adjust the shutters 16 to a closed position, thereby hiding the article(s) placed in the cavity 258. It is also contemplated that if article(s), A, have a height greater than the depth, C, of the cavity 258, the dial 18 is adjustable to partially close the tips 42 of the plurality of shutters 16 upon article(s), A. Functionally, when the shutters 16 close upon the article(s), A, having a height greater than the depth, C, improved frictional retention of the article(s), A, in the container is achieved. For example, the article having a smaller diameter than the cavity 258 is positioned on top of the bottom wall 260 and when the user adjusts the dial 18, the tips 42 of the shutters 16 close upon the article such that the tips 42 frictionally engage the outer surface of the article. Accordingly, the rotary shutter actuated container assembly 200 functions in a universal, one-size-fits-all, conformable holder such that beverage containers of different sizes and shapes placed within the cavity 258 are less likely to tip, thereby possibly spilling the contents therein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary shutter actuator comprising:
    an annular retainer having a plurality of retainer fasteners disposed thereon, said retainer fasteners circumferentially placed around said retainer;
    a rotatable member supported by said retainer;
    a plurality of shutters swivelably coupled to said retainer, wherein each of said plurality of shutters has a first end and a second end, and said plurality of shutters are arranged in a non-overlapping configuration;
    a connection mechanism intermediate to said first end and said second end of each of said plurality of said shutters, wherein said rotatable member is operably connected to each of said plurality of shutters by said connection mechanism for creating a moment arm for actuating said plurality of shutters; and
    an exposed dial adapted to be rotated by a user, said dial defining an opening and being operably connected to each of said plurality of shutters and said rotatable member, whereby rotation of said dial results in said plurality of shutters moving to and from a fully open and closed position and causing said rotatable member to rotate;
    wherein said plurality of shutters are sandwiched between a rear side of said dial and a front side of said rotatable member.

2. The rotary shutter actuator of claim 1 further comprising a slot formed on each of said plurality of shutters, wherein each of said plurality of retainer fasteners are at least partially disposed in a respective said slot to swivelably connect said shutters and said retainer portion.

3. The rotary shutter actuator of claim 2, wherein when said dial is rotated, said rotating motion transfers to said shutters and said rotatable member, and said retainer fasteners extending into said respective slots on said shutters, so that the movement of said shutters is directed by the shapes of said respective slots.

4. The rotary shutter actuator of claim 1, wherein said connection mechanism is a hole on each of said plurality of shutters, and said dial has an integral fastener extending through each of said plurality of shutters and at least partially into said rotatable member.

5. The rotary shutter actuator of claim 1, wherein said plurality of shutters are arranged on a common plane circumferentially around said retainer.

6. The rotary shutter actuator of claim 1 further comprising an outer ring with a first diameter and a recessed inner ring with a second diameter on said retainer, wherein rotatable member rests on said inner ring and the contacts an inner wall connecting said outer ring to said inner ring.

7. The rotary shutter actuator of claim 1, wherein at least one of said retainer and said rotatable member has a groove radially displaced, and the other of said retainer and said rotatable member has an extension that is placed in said groove to rotatably connect said rotatable member and said retainer.

8. The rotary shutter actuator of claim 1 further comprising an outer ring and a recessed inner ring on said retainer, and a friction element between said retainer and said rotatable member, wherein said friction element creates a friction between said retainer and said rotatable member so that said friction must be overcome to rotate said rotatable member along said inner ring.

9. The rotary shutter actuator of claim 1 further comprising a plurality of stoppers extending from said retainer, wherein said shutters contact said plurality of stoppers when said shutters are in said fully open position so that said plurality of stoppers prevent said shutters from moving beyond a desired point.

10. The rotary shutter actuator of claim 1, wherein when said shutters are in said closed position said shutters are prevented from moving by a leading edge of said shutter contacting a trailing edge of an adjacent said shutter.

11. The rotary shutter actuator of claim 1 further comprising a tip on said shutter, wherein when said shutters are in said closed position said shutters are prevented from moving by said tip of said shutter contacting said tip of an adjacent said shutter.

12. The rotary shutter actuator of claim 1, wherein said rotary shutter actuator is positioned over an air vent of a vehicular heating, ventilation, and air conditioning system, such that the position of said shutters controls the airflow through said air vent.

13. The rotary shutter actuator of claim 1 further comprising a housing attached to said retainer having at least one side wall and a base defining a cavity.

14. A rotary shutter actuator comprising:
   a retainer having an outer ring and an inner ring, wherein said outer ring has a first diameter and said inner ring has a second diameter and is recessed with respect to said outer ring so that an inner wall on said retainer portion connects said outer ring and said inner ring;
   a rotatable member supported by said retainer, wherein said rotatable member rotates within said inner ring;
   a plurality of shutters swivelably coupled to said retainer on a common plane, wherein each of said plurality of shutters has a first end and a second end, and said plurality of shutters are arranged in a non-overlapping configuration;
   a plurality of retainer fasteners extending from at least one of said retainer and said plurality of shutters, wherein a respective slot corresponding to each of said plurality of retainer fasteners is formed on the other of said retainer and each of said plurality of shutters, and each of said plurality of retainer fasteners is at least partially disposed in each said respective slot to swivelably connect said shutters and said retainer portion;
   a connection mechanism intermediate to said first end and said second end of each of said plurality of said shutters, wherein said rotatable member is operably connected to each of said plurality of shutters by said connection mechanism for creating a moment arm for actuating said plurality of shutters; and
   an exposed dial adapted to be rotated by a user, said dial defining an opening and being operably connected to each of said plurality of shutters and said rotatable member, whereby rotation of said dial results in said plurality of shutters moving to and from a fully open and closed position and causing said rotatable member to rotate;
   wherein said plurality of shutters are sandwiched between a rear side of said dial and a front side of said rotatable member.

15. The rotary shutter actuator of claim 14, wherein when said retainer fasteners are disposed on said retainer, said retainer fasteners are circumferentially placed around said retainer.

16. The rotary shutter actuator of claim 14, wherein when said dial is rotated, said rotating motion transfers to said shutters and said rotatable member, and said retainer fasteners extending into said respective slots on said shutters, so that the movement of said shutters is directed by the shapes of said respective slots.

17. The rotary shutter actuator of claim 14, wherein said connection mechanism is a hole on each of said plurality of shutters, and said dial has an integral fastener extending through each of said plurality of shutters and at least partially into said rotatable member.

18. The rotary shutter actuator of claim 14 further comprising a friction element between said retainer and said rotatable member, wherein said friction element creates a friction between said retainer and said rotatable member so that said friction must be overcome to rotate said rotatable member along said inner ring.

19. The rotary shutter actuator of claim 14 further comprising a plurality of stoppers extending from said retainer, wherein said shutters contact said plurality of stoppers when said shutters are in said fully open position so that said plurality of stoppers prevent said shutters from moving beyond a desired point.

20. The rotary shutter actuator of claim 14, wherein when said shutters are in said closed position said shutters are prevented from moving by a leading edge of said shutter contacting a trailing edge of an adjacent said shutter.

21. The rotary shutter actuator of claim 14 further comprising a tip on said shutter, wherein when said shutters are in said closed position said shutters are prevented from moving by said tip of said shutter contacting said tip of an adjacent said shutter.

22. The rotary shutter actuator of claim 14, wherein said rotary shutter actuator is positioned over an air vent of a vehicular heating, ventilation, and air conditioning system, such that the position of said shutters controls the airflow through said air vent.

23. The rotary shutter actuator of claim 14 further comprising a housing attached to said retainer having at least one side wall and a base defining a cavity.

24. A rotary shutter container assembly comprising:
a retainer having an outer ring and an inner ring, wherein said outer ring has a first diameter and said inner ring has a second diameter and is recessed with respect to said outer ring so that an inner wall on said retainer portion connects said outer ring and said inner ring;
a rotatable member supported by said retainer, wherein said rotatable member rotates within said inner ring;
a plurality of shutters swivelably coupled to said retainer on a common plane, wherein each of said plurality of shutters has a first end and a second end, and said plurality of shutters are arranged in a non-overlapping configuration;
a plurality of retainer fasteners extending from at least one of said retainer and said plurality of shutters, wherein a respective slot corresponding to each of said plurality of retainer fasteners is formed on the other of said retainer and each of said plurality of shutters, and each of said plurality of retainer fasteners is at least partially disposed in each said respective slot to swivelably connect said shutters and said retainer portion;
a connection mechanism intermediate to said first end and said second end of each of said plurality of said shutters, wherein said rotatable member is operably connected to each of said plurality of shutters by said connection mechanism for creating a moment arm for actuating said plurality of shutters;
an exposed dial adapted to be rotated by a user, said dial defining an opening and being operably connected to each of said plurality of shutters and said rotatable member, whereby rotation of said dial results in said plurality of shutters moving to and from a fully open and closed position and causing said rotatable member to rotate; and
a housing attached to said retainer having at least one side wall and a base defining a cavity;
wherein said plurality of shutters are sandwiched between a rear side of said dial and a front side of said rotatable member.

25. The rotary shutter container assembly of claim 24, wherein when said retainer fasteners are disposed on said retainer, said retainer fasteners are circumferentially placed around said retainer.

26. The rotary shutter container assembly of claim 24, wherein when said dial is rotated, said rotating motion transfers to said shutters and said rotatable member, and said retainer fasteners extending into said respective slots on said shutters, so that the movement of said shutters is directed by the shapes of said respective slots.

27. The rotary shutter container assembly of claim 24, wherein said connection mechanism is a hole on each of said plurality of shutters, and said dial has an integral fastener extending through each of said plurality of shutters and at least partially into said rotatable member.

28. The rotary shutter container assembly of claim 24 further comprising a friction element between said retainer and said rotatable member, wherein said friction element creates a friction between said retainer and said rotatable member so that said friction must be overcome to rotate said rotatable member along said inner ring.

29. The rotary shutter container assembly of claim 24 further comprising a plurality of stoppers extending from said retainer, wherein said shutters contact said plurality of stoppers when said shutters are in said fully open position so that said plurality of stoppers prevent said shutters from moving beyond a desired point.

30. The rotary shutter container assembly of claim 24, wherein when said shutters are in said closed position said shutters are prevented from moving by a leading edge of said shutter contacting a trailing edge of an adjacent said shutter.

31. The rotary shutter container assembly of claim 24 further comprising a tip on said shutter, wherein when said shutters are in said closed position said shutters are prevented from moving by said tip of said shutter contacting said tip of an adjacent said shutter.

* * * * *